(12) United States Patent
Sivertsen

(10) Patent No.: US 8,078,770 B1
(45) Date of Patent: Dec. 13, 2011

(54) COMBINING MULTIPLE SGPIO STREAMS TO PROVIDE DEVICE STATUS INDICATORS

(75) Inventor: Clas Gerhard Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 192 days.

(21) Appl. No.: 11/837,287

(22) Filed: Aug. 10, 2007

(51) Int. Cl.
*G06F 3/00* (2006.01)
*G06F 13/38* (2006.01)

(52) U.S. Cl. .................................. 710/19; 710/71
(58) Field of Classification Search .............. 710/19
See application file for complete search history.

(56) References Cited

U.S. PATENT DOCUMENTS

| | | | |
|---|---|---|---|
| 5,835,700 A * | 11/1998 | Carbonneau et al. | 714/44 |
| 6,078,979 A | 6/2000 | Li et al. | |
| 6,145,020 A * | 11/2000 | Barnett | 710/8 |
| 6,374,317 B1 * | 4/2002 | Ajanovic et al. | 710/105 |
| 6,957,291 B2 | 10/2005 | Moon et al. | |
| 6,993,772 B2 * | 1/2006 | Pike et al. | 719/321 |
| 7,110,928 B1 | 9/2006 | Lee | |
| 7,383,371 B2 | 6/2008 | Kasahara | |
| 2004/0193973 A1 | 9/2004 | Porat et al. | |
| 2005/0138154 A1 | 6/2005 | Seto | |
| 2005/0182881 A1 | 8/2005 | Chou et al. | |
| 2006/0149881 A1 * | 7/2006 | Clayton et al. | 710/302 |
| 2006/0194460 A1 * | 8/2006 | Chen et al. | 439/108 |
| 2006/0212760 A1 | 9/2006 | Swoboda | |
| 2007/0079032 A1 * | 4/2007 | Bissessur et al. | 710/71 |

OTHER PUBLICATIONS

"SFF-8485 Specification for Serial GPIO Bus," Feb. 3, 2005, Revision 0.5, SFF Committee, 41 pages.

U.S. Appl. No. 11/211,271, filed Aug. 25, 2005 entitled "Method and Integrated Circuit for Providing Enclosure Management Services Utilizing Multiple Interfaces and Protocols", Inventor: Clas Gerhard Sivertsen.
U.S. Official Action dated May 29, 2009 in U.S. Appl. No. 11/211,271.
U.S. Appl. No. 11/837,256, filed Aug. 10, 2007 entitled "Detecting the Presence and Activity of a Mass Storage Device", Inventor: Clas Gerhard Sivertsen.
U.S. Notice of Allowance / Allowability dated Oct. 20, 2009 in U.S. Appl. No. 11/837,256.
U.S. Appl. No. 12/363,077, filed Jan. 30, 2009, entitled "Multiple Frequency State Detection for Serial I/O Interfaces," Inventor: Kayalvizhi Dhandapani.
U.S. Notice of Allowance/Allowability dated Dec. 8, 2009 in U.S. Appl. No. 11/211,271.
U.S. Notice of Allowance/Allowability dated Feb. 5, 2010 in U.S. Appl. No. 11/837,256.

* cited by examiner

*Primary Examiner* — Henry Tsai
*Assistant Examiner* — Titus Wong
(74) *Attorney, Agent, or Firm* — Tim Tingkang Xia, Esq.; Morris Manning & Martin, LLP

(57) ABSTRACT

Technologies are described herein for combining multiple SGPIO streams to provide a single mass storage device activity indicator. Device activity data indicating whether a mass storage device is active may be received on a first interface, such as an SGPIO interface. Device activity data indicating whether the mass storage device is active may also be received on a second interface, such as a second SGPIO interface. An activity signal may also be received from the mass storage device itself. An activity indicator is provided when either data received on the first interface, data received on the second interface, or the activity signal received from the mass storage device indicates that the mass storage device is active. Status data regarding the failure, rebuild status, and location of a mass storage device received on multiple interfaces may also be combined to drive a single indicator.

17 Claims, 9 Drawing Sheets

COMBINING MULTIPLE SGPIO STREAMS TO PROVIDE DEVICE STATUS INDICATORS

BACKGROUND

In large scale computing systems, it is often necessary to provide an operator with detailed information regarding the status of mass storage devices. In order to provide such functionality, many storage solutions utilize a storage backplane that interfaces with a host bus adapter ("HBA") and that directly mates with one or more mass storage devices. A storage backplane may include an integrated enclosure management device, which provides facilities for generating visual indicators regarding the status of connected mass storage devices. For instance, in some solutions, an enclosure management device on a storage backplane may drive individual light-emitting diodes ("LEDs") for displaying information regarding the activity of each of the mass storage devices connected to the storage backplane.

Computer system vendors frequently design and manufacture storage backplanes that are customized for particular configurations. One reason for this is that although Serial Attached Small Computer Systems interface ("SAS") mass storage devices and Serial Advanced Technology Attachment ("SATA") mass storage devices utilize the same physical connectors to interface with a storage backplane, signals regarding the activity status of the devices is obtained in two different ways. When SAS mass storage devices are utilized, for instance, drive activity data is typically obtained by the backplane via a Serial General Purpose Input/Output ("SGPIO") interface. When SATA drives are utilized, drive activity data is obtained directly from the mass storage device itself.

Another factor that complicates the design and manufacture of storage backplanes is the fact that the SAS-2 Specification defines two interface ports for each mass storage device. This provides redundancy and allows two SAS initiators to be connected to a single mass storage device. In such an implementation, two SGPIO interfaces are also available. As a result, depending upon the type of mass storage devices utilized, there are at least three possible sources for obtaining information regarding the activity status of the devices: two or more SGPIO interfaces and the drive activity data provided by the mass storage devices themselves. Similar problems are encountered when data regarding the failure, location, and rebuild status of mass storage devices is provided on multiple interfaces. It is, however, complex and expensive for a computer system vendor to design, manufacture, and distribute a different storage backplane implementation for each possible type of mass storage device and interface that may be utilized to provide drive activity information.

It is with respect to these considerations and others that the disclosure presented herein is made.

SUMMARY

Technologies are described herein for combining multiple SGPIO streams to provide device status indicators, such as mass storage device activity indicators, failure indicators, location indicators, and rebuild indicators. In particular, through the use of the concepts and technologies presented herein, a single storage backplane can be provided that is capable of driving status indicators for a mass storage device, such as an LED, regardless of whether the status information is provided on multiple SGPIO interfaces or by the mass storage device itself. The storage backplane can also combine data received on multiple SGPIO interfaces to drive a single indicator for providing the location of the device, indicating that the device has failed, or that the device is being rebuilt.

According to one aspect presented herein, device activity data indicating whether a mass storage device is active may be received on a first interface, such as an SGPIO interface. Device activity data indicating whether the mass storage device is active may also be received on a second interface, such as a second SGPIO interface. An activity indicator is provided when either data received on the first interface or data received on the second interface indicates that the mass storage device is active. In one implementation, providing the activity indicator comprises illuminating an LED corresponding to the mass storage device to indicate that the device is active.

According to other aspects, an activity signal may also be received from the mass storage device itself. For instance, according to implementations, a SATA mass storage device may provide an activity signal on a READY LED pin of a SAS receptacle connector or a SATA receptacle connector. In this embodiment, an activity indicator is provided when either data received on the first interface, data received on the second interface, or the activity signal received from the mass storage device indicates that the mass storage device is active.

According to other aspects provided herein, device activity data received on one of the SGPIO interfaces is given priority over an activity signal provided by the mass storage device. In this manner, the activity indicator is illuminated based on data received on the SGPIO interfaces when the SGPIO interfaces and the device activity data received from the mass storage device concurrently indicate that the mass storage device is active. In other embodiments, priority may be given to the device activity data provided by the mass storage device when it is determined that one or both of the SGPIO interfaces has become inactive. Inactivity may be based on the content of the data received on the SGPIO interfaces or based on the lack of activity on the SGPIO interfaces.

According to other aspects, the presence of a mass storage device may also be detected by sensing the voltage across a pull-up resistor connected to a voltage source and to a pin on the SAS or SATA receptacle connector. If it is detected that the mass storage device is not mated, data received on the SGPIO interfaces will be ignored and no activity indicator will be provided. In other embodiments, the activity indicator is illuminated when the presence of a mass storage device is detected and extinguished when the mass storage device is determined to be active. In this manner, the same indicator can be utilized to provide information regarding device presence and device activity. According to embodiments, status information regarding the failure, location, or rebuild status received on multiple interfaces may also be combined and utilized to drive an appropriate indicator.

The above-described aspects may also be implemented as a computer-controlled apparatus, a computer process, a computing system, an apparatus, as an article of manufacture such as a computer program product or computer-readable medium, or as a semiconductor integrated circuit, including but not limited to a custom application specific integrated circuit, a programmable micro-controller type device, or a field-programmable gate array device. The computer program product may be a computer storage media readable by a computer system and encoding a computer program of instructions for executing a computer process.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

These and various other features as well as advantages, which characterize the technologies presented herein, will be apparent from a reading of the following detailed description and a review of the associated drawings.

DETAILED DESCRIPTION

Figure 1:
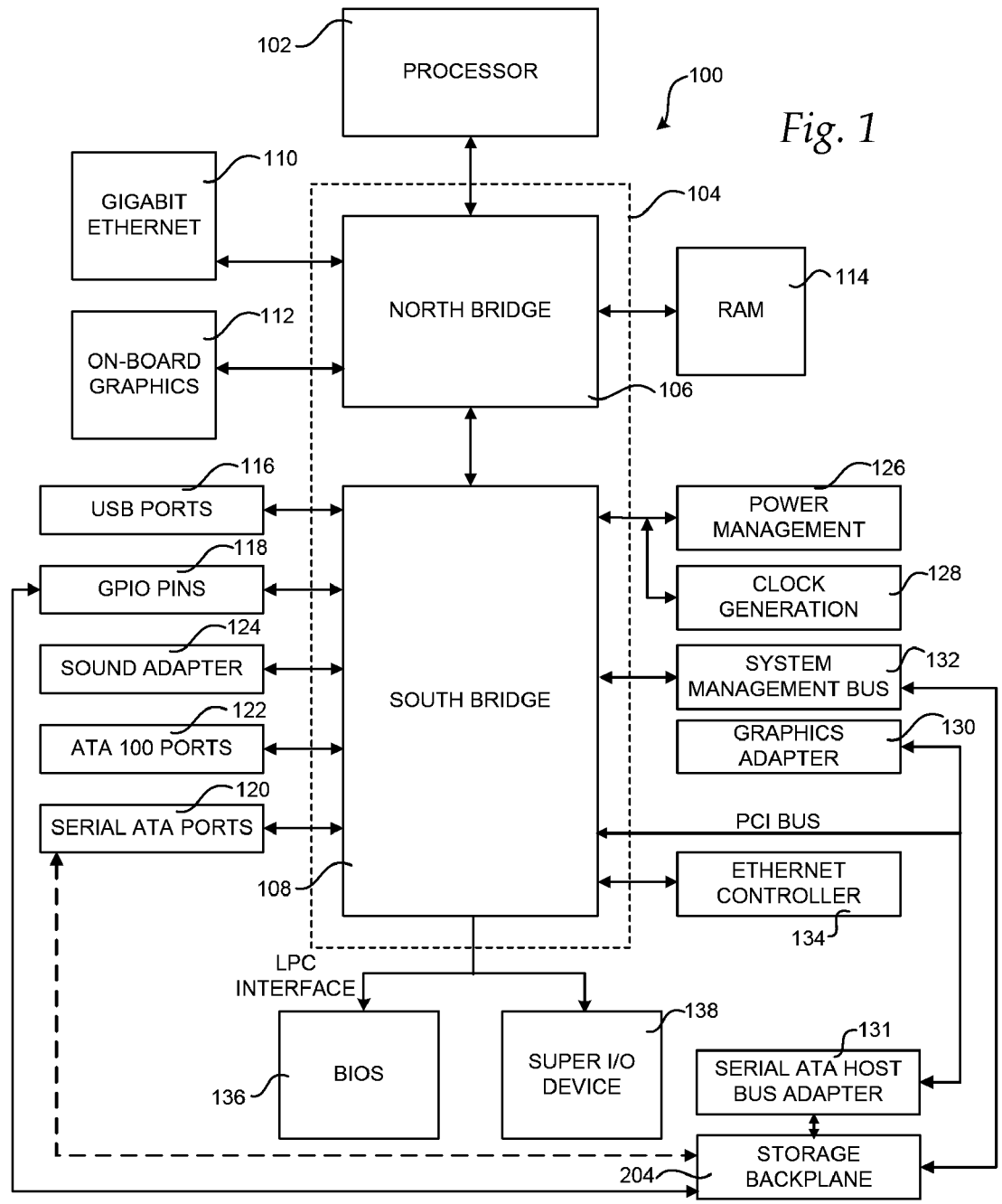
FIG. 1 is a computer architecture diagram showing aspects of a computer utilized as an illustrative operating environment for the various embodiments presented herein.

Technologies are presented herein for combining multiple SGPIO streams to provide a single mass storage device status indicator. In the following detailed description, references are made to the accompanying drawings that form a part hereof, and in which are shown by way of illustration specific embodiments or examples. Referring now to the drawings, in which like numerals represent like elements through the several figures, aspects of the technologies presented herein and an exemplary operating environment will be described.

FIG. 1 and the following discussion are intended to provide a brief, general description of a suitable computing environment in which the concepts presented herein may be implemented. Generally, program modules include routines, programs, components, data structures, and other types of structures that perform particular tasks or implement particular abstract data types. Moreover, those skilled in the art will appreciate that the concepts presented herein may be practiced with other computer system configurations, including hand-held devices, multiprocessor systems, microprocessor-based or programmable consumer electronics, minicomputers, mainframe computers, and the like.

Referring now to FIG. 1, details regarding an illustrative operating environment for the embodiments presented herein will be provided. In particular, FIG. 1 illustrates a computer architecture that may be utilized in conjunction with the embodiments presented herein. It should be appreciated, however, that although the embodiments described herein are discussed in the context of a conventional server computer, the concepts presented herein might be utilized with virtually any type of computing device. FIG. 1 illustrates a host computer that, as will be described in greater detail below, may utilize one or more enclosure management backplanes 204 to interface with one or more mass storage devices. The enclosure management backplanes 204 described herein are equipped with circuitry for detecting the presence and activity of mass storage devices. It should be appreciated that the architecture of the computer 100 is merely illustrative and that any type of computer capable of hosting a HBA and a backplane 204 with enclosure management functionality may be utilized.

In order to provide the functionality described herein, the computer 100 shown in FIG. 1 includes a baseboard, or "motherboard", which is a printed circuit board to which a multitude of components or devices may be connected by way of a system bus or other electrical communication path. In one illustrative embodiment, a processor ("processor" or "CPU") 102 operates in conjunction with a chipset 104. The CPU 102 is a standard central processor that performs arithmetic and logical operations necessary for the operation of the computer 100.

The chipset 104 includes a north bridge 106 and a south bridge 108. The north bridge 106 provides an interface between the CPU 102 and the remainder of the computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections that may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general-purpose input/output ("GPIO") pins 118. The south bridge 108 may also provide a system management bus 132 for use in managing the various components of the computer 100. Power management circuitry 126 and clock generation circuitry 128 may also be utilized during the operation of the south bridge 108. The south bridge 108 may also provide a bus for interfacing peripheral card devices such as a graphics adapter 130. In one embodiment, the bus comprises a peripheral component interconnect ("PCI") bus. The PCI bus may also be utilized to interface with one or more HBAs, such as the serial ATA HBA 131. As described in greater detail below, the HBA 131 may be connected to a storage backplane 204 for providing enclosure management functionality.

According to embodiments, the south bridge 108 is an enhanced south bridge operative to provide a HBA for connecting mass storage devices to the computer 100 without the use of an add-in card such as the PCI HBA 131. For instance, according to an embodiment, the south bridge 108 includes an advanced technology attachment ("ATA") adapter for providing one or more SATA ports 120 and an ATA 100 adapter for providing one or more ATA 100 ports 122. The SATA ports 120 and the SATA 100 ports 122 may be, in turn, connected directly to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user. Alternatively, the serial ATA ports 120 may be connected to a storage backplane 204 for providing enclosure management functionality as described herein.

The mass storage devices connected to the south bridge 108, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any type of computer-readable media. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information.

The south bridge 108 may also provide a low pin count ("LPC") interface for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing a basic input/output system ("BIOS") 136 or an extensible firmware interface ("EFI") compatible firmware that includes program code containing the basic routines that help to start up the computer 100 and to transfer information between elements within the computer 100. It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
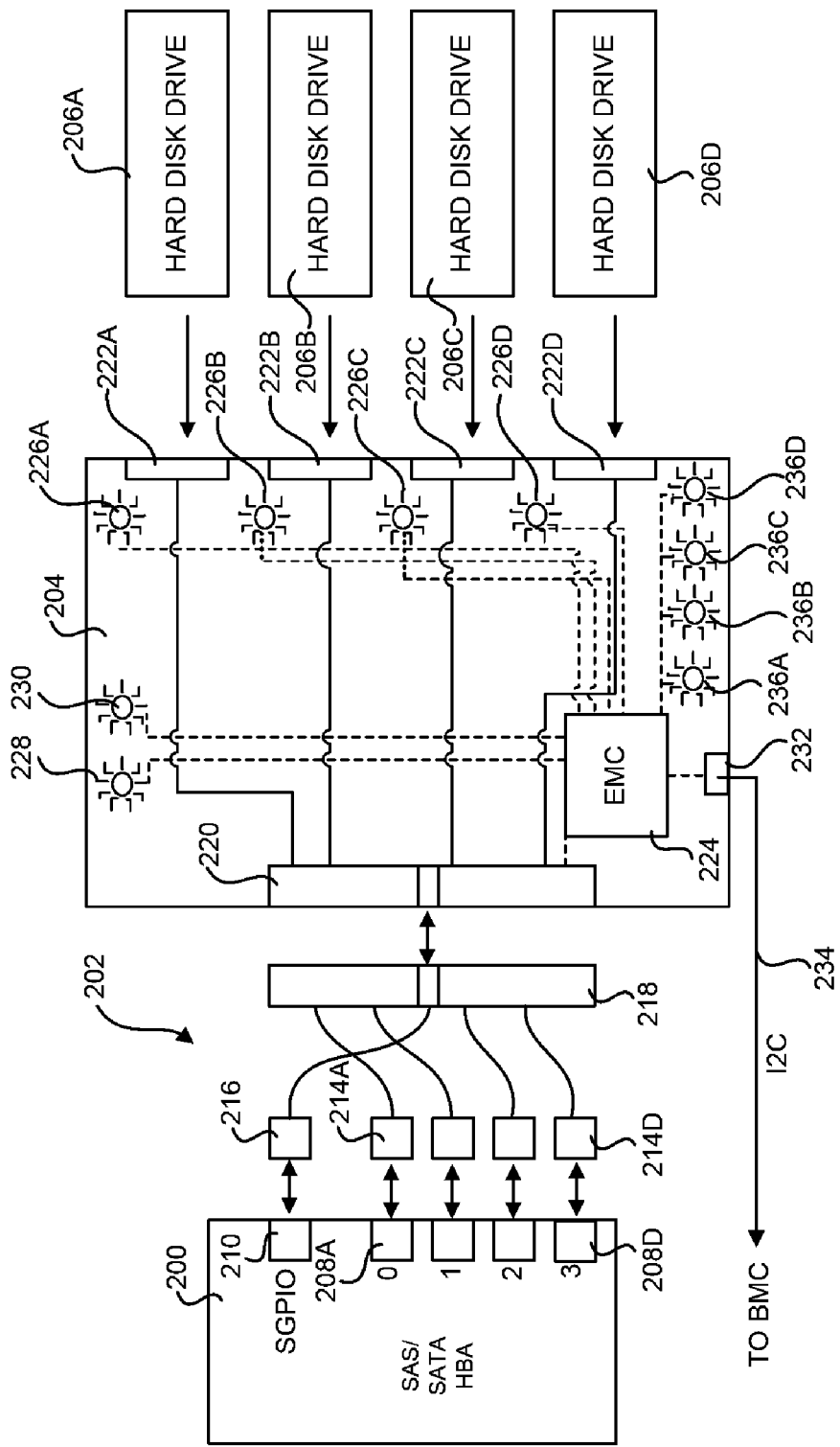
FIG. 2 is a block diagram illustrating aspects of a host bus adapter, enclosure management controller, and storage backplane provided in embodiments disclosed herein.

Turning now to FIG. 2, additional details regarding one operating environment for the embodiments presented herein and aspects of a storage backplane 204 (also referred to herein as an "enclosure management backplane") provided herein will be described. As shown in FIG. 2, an HBA 200 having one or more ports 208A-208D may be utilized in conjunction with a computing system, such as the computer 100 described above with respect to FIG. 1. According to embodiments, the HBA 200 comprises an HBA for use with SATA mass storage devices or an HBA compatible with SAS mass storage devices. It should be appreciated that other types of HBAs compatible with other types of mass storage devices may also be utilized.

According to embodiments, different physical interfaces may be utilized by the HBA 200 to exchange enclosure management data between the HBA 200 and the enclosure management backplane 204. For instance, some SAS-compatible HBAs are equipped with a serial general purpose input/output ("SGPIO") interface, while some SATA-compatible HBAs, on the other hand, utilize a control or management bus, such as the I2C bus from PHILIPS SEMICONDUCTORS, to exchange enclosure management data between the enclosure management backplane 204 and the HBA 200 or a baseboard management controller ("BMC"). In the case of an HBA 200 equipped with SGPIO, an SGPIO port 210 is included on the HBA 200 for making an appropriate connection with the backplane 204. According to embodiments, the port 210 can be utilized to carry a second I2C channel rather than SGPIO. This may be a user-configurable feature.

When the HBA 200 is equipped with an I2C bus, an appropriate I2C port is made available on a BMC to communicate with the enclosure management backplane 204. In other implementations, typically where SATA mass storage devices are utilized, no physical interface for communicating management data between the HBA 200 and the backplane 204 may be utilized. In even other embodiments, the system management bus ("SMBus") developed by INTEL CORPORATION may be utilized.

It should be appreciated that the particular physical interfaces described herein for exchanging enclosure management information with the backplane are merely illustrative and that any physical communications link suitable for transmitting enclosure management data may be utilized with the various embodiments presented herein. The HBA 200 may also support multiple enclosure management interfaces and protocols, such as I2C and SGPIO both, multiple interfaces of the same type, or some custom enclosure management bus.

The HBA 200 may also have one or more jumpers or additional pins on the cable or connectors used to carry the enclosure management interface from the HBA 200 to the backplane 204. These additional pins may be used to communicate to the HBA 200 which interface should be used, in the case where there are multiple options. Additionally, the HBA 200 may utilize some form of automatic or default detection mechanism, where it would transmit data over the various available interfaces, and then either not receive a response on the interfaces where there is no available enclosure management device, or receive a response from a device that can acknowledge the response for the particular protocol that the HBA 200 sent out a query for.

It is also possible that an HBA 200 can be configured to support a particular enclosure management protocol by upgrading the firmware of the HBA 200, or by using host-side applications, command line utilities, or configuration monitors i.e. over a direct serial port to the HBA 200. This same access and configuration method could be used to change or otherwise configure specific instructions and commands that are sent to the enclosure management backplane.

As shown in FIG. 2, an appropriate cable may be utilized to connect the ports 208A-208D of the HBA 200 to the enclosure management backplane 204. In particular, individual cables may be utilized to connect the ports 208A-208D to the backplane 204. Alternatively, a multilane cable 202 may be utilized to connect the individual ports on the HBA 200 to a single multilane connector 220 on the backplane 204. It should be appreciated that the multilane cable 202 may be equipped with multilane connectors on both ends or only on one end, as shown in FIG. 2. Where the multilane cable 202 includes only one multilane connector 218, the other end may be configured with individual connectors 214A-214D compatible with the ports 208A-208D on the HBA 200. It should also be appreciated that although the HBA 200 has been illustrated as having four ports 208A-208D, HBAs with other port configurations may be utilized. Alternatively, the backplane 204 may be configured for use with fewer or more drives. Other configurations should also be apparent.

When the HBA 200 comprises a SAS-compatible HBA and includes a SGPIO port 210, the multilane cable 202 may further include an appropriate connector 216 for connecting to the SGPIO port 210. The multilane connector 218 is also appropriately configured for passing the side-band signals from the SGPIO port 210 to an appropriate portion of the multilane connector 220 on the backplane 204. When the HBA 200 comprises a SATA-compatible HBA and I2C is utilized, an appropriate I2C cable 234 may be utilized for connecting a BMC to the I2C port 232. As will be described in greater detail below, the SGPIO signals are routed from the multilane connector 220 to an enclosure management integrated circuit ("IC") 224 on the enclosure management backplane 204 and the I2C signals are routed to the enclosure management integrated circuit 224 on the enclosure management backplane 204. The backplane 204 and the enclosure management controller IC 224 are configured in one embodiment to receive enclosure management information on multiple interfaces to thereby support the use many types and configurations of HBAs.

As also shown in FIG. 2, the enclosure management backplane 204 includes connectors 222A-222D for directly interfacing with one or more mass storage devices, such as the hard disk drives 206A-206D. According to embodiments, the backplane 204 may be mounted within an enclosure such that the hard disk drives 206A-206D slide into the slots in an enclosure and thereby mate directly with the appropriate connector 222A-222D. The backplane 204 also includes circuitry for routing signals to and from the connectors 222A-222D to the appropriate portions of the multilane connector 220. In this manner, the backplane 204 enables direct communication between then HBA 200 and the connected hard disk drives 206A-206D. According to embodiments, the connectors 222A-222D comprise SAS receptacle connectors for receiving a SAS or SATA mass storage device.

As discussed briefly above, the enclosure management backplane 204 provides a number of enclosure management functions. To enable this functionality, the enclosure management backplane 204 is equipped with an enclosure management IC 224. The enclosure management IC 224 is configured to receive enclosure management data on one of any number of physical interfaces, such as I2C and SGPIO, and to perform various management functions in response to receiving this data. For instance, the enclosure management IC 224 may receive data from the HBA 200 instructing it to illuminate one of the LEDs 226A-226D for locating a particular one of the hard disk drives 206A-206D. The enclosure management IC 224 may also illuminate the LEDs 226A-226D to indicate activity on the hard disk drives 206A-206D or that one of the hard disk drives 206A-206D is being rebuilt. The LEDs 236A-236D may also be illuminated by the enclosure management IC 224 to indicate that one of the hard disk drives 206A-206D has failed. LEDs 228 and 230 may also be illuminated to provide a global indication that one of the hard disk drives 206A-206D, or a hard disk drive connected to another connected backplane is active or has failed. The enclosure management IC 224 may also provide information to the HBA 200. For instance, the enclosure management controller IC 224 may provide data to the HBA 200 indicating whether a particular drive is mated to the backplane 204. Additional details regarding the configuration and operation of the enclosure management controller IC 224 are provided below with respect to FIG. 3.

Figure 3:
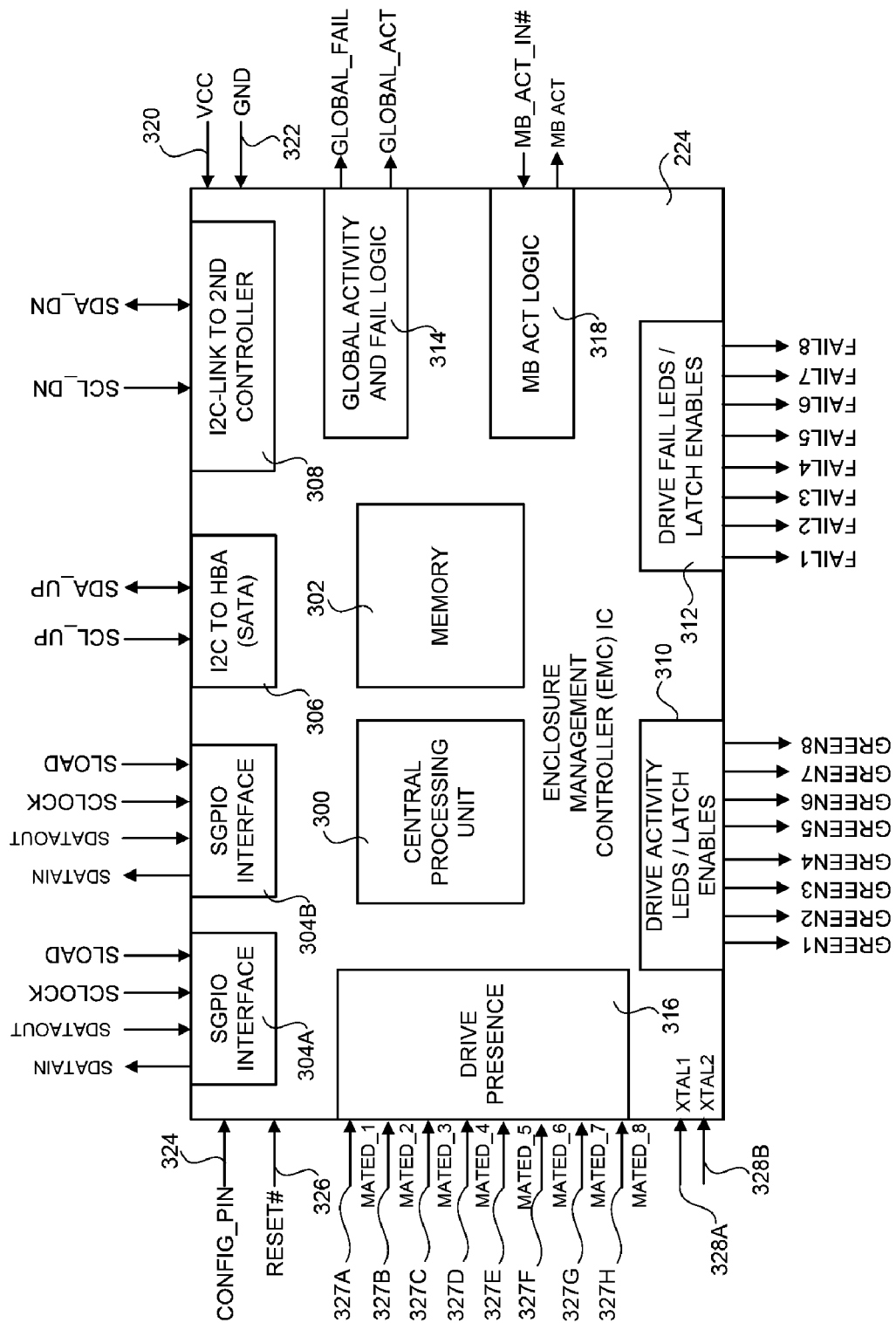
FIG. 3 is a functional block diagram illustrating aspects of an enclosure management controller integrated circuit provided in one embodiment presented herein.

Referring now to FIG. 3, a functional block diagram illustrating aspects of an enclosure management controller IC 224 provided herein will be described. As shown in FIG. 3, the enclosure management IC 224 includes a CPU 300 and memory 302 in one implementation. The CPU 300 controls the overall operation of the IC 224 as described herein. The CPU 300 may utilize the memory 302 during the performance of its processing functions. It should be appreciated that although the IC 224 is described herein as a programmable micro-controller including a CPU 300 and memory 302, the embodiments presented herein may also be implemented utilizing a general purpose computer, a custom application specific integrated circuit, a field-programmable gate array device, or any other type of IC or computing known to those skilled in the art.

According to embodiments, the enclosure management IC 224 shown in FIG. 3 is equipped with multiple physical interfaces for communicating enclosure management data. For instance, the IC 224 may include two or more SGPIO interfaces 304A-304B for communicating enclosure management data with SAS-equipped HBAs or other types of SAS initiators. The SGPIO interfaces 304A-304B support four signals: SDATAOUT, the serial data output bit stream from the initiator; SDATAIN, the serial output stream to the initiator; SCLOCK, the clock signal from the initiator; and SLOAD, the last clock of a bit stream from the initiator. Using these signals, the IC 224 can receive information regarding the status of connected mass storage devices, such as data indicating whether a mass storage device is active. The format of these signals is known to those skilled in the art.

According to embodiments, the enclosure management IC 224 is also equipped with an I2C interface 306 for communicating enclosure management data with a BMC or the system management bus 132. The interface 306 includes two signals: SCL_UP, the serial clock line for connection to the BMC, system management bus, or another upstream I2C device; and SDA_UP, the serial data line for connection to the BMC, system management bus, or another upstream I2C device. An interface 308 may also be provided for connecting to a downstream I2C device. The interface 308 includes two signals: SCL_DN, the serial clock line for connection to a downstream I2C device; and SDA_DN, the serial data line for connection to a downstream I2C device. It should be appreciated that, in one embodiment, the HBA 200 communicates with the IC 224 over a private I2C bus. In this case, the SCSI enclosure services ("SES") protocol is utilized. The I2C or SGPIO bus can be routed to the backplane 204 through the cable 202.

The enclosure management controller IC 224 may also include circuitry for generating output signals for driving a visual or audible indicator. For instance, an output portion 310 may be provided for illuminating LEDs or other types of activity indicators when one or more of the connected hard disk drives are active. A mechanism for determining when connected mass storage devices are active and driving the activity indicators is described below with reference to FIGS. 4-9.

An output portion 312 may also be provided for driving LEDs when one or more of the connected hard disk drives has failed. It should be appreciated that a separate output is provided for driving an individual LED indicating the activity or failure of each hard disk drive. In other embodiments, the enclosure management controller IC 224 also includes circuitry 314 for driving an indicator showing global failure and global activity. It should be appreciated that these outputs may be configured to either drive an LED directly or to connect to an upstream IC 224. In this manner, the activity and failure or drives connected to one IC 224 may be communicated to additional upstream ICs 224. In other embodiments, the outputs of the output portions 310 and 312 may also be utilized as latch enables to drive external latches and thereby illuminate a larger quantity of LEDs.

The enclosure management controller IC 224 also includes an input 320 for receiving an appropriate voltage for powering the operation of the IC 224 (typically +5V DC), an input 322 for connecting to ground, inputs 238A-238B for receiving an appropriate clock signal, an input 324 for enabling a configuration of the IC 224, and a reset input 326 for resetting the operation of the IC 224. Additional details regarding the operation of the enclosure management controller IC 224 and associated circuitry are provided below with respect to FIGS. 4-9.

As shown in FIG. 3, the IC 224 also includes one or more pins 327A-327H connected to drive presence circuitry 316 capable of detecting the presence of a mass storage device. As will be discussed in detail below with respect to FIG. 4-6, the drive presence circuitry 316 comprises an analog-to-digital converter ("ADC") in one embodiment that is configured to detect the voltage on the pins 327A-327H and, based on the detected voltage, to determine whether a mass storage device has been connected. In this embodiment, each of the pins 327A-327H is utilized to convey information regarding the mated status of a single mass storage device. According to embodiments, the drive presence circuitry 316 may also comprise one or more comparators configured to detect the voltage on the pins 327A-327H.

As will also be described in detail below with respect to FIGS. 4-6, the pins 327A-327H and the drive presence circuitry 316 may also be configured in one embodiment to detect the activity of a mass storage device. In this regard, the IC 224 is configured to determine, based on the voltage read at each of the pins 327A-327H, whether a mass storage device connected to each of the pins 327A-327H is active. In this manner, a single one of the pins 327A-327H of the IC 224 can be utilized to determine the mated status of a mass storage device and whether a connected mass storage device is active or inactive. The IC 224 may transmit data regarding the mated status of each mass storage device to an HBA via the SGPIO interfaces 304A-304B or the I2C interface 306. The IC 224 may also utilize the detected activity information to directly drive the drive LEDs corresponding to active mass storage devices using the output portion 310. Additional details regarding this process are provided below with respect to FIGS. 4-9.

Figure 4:
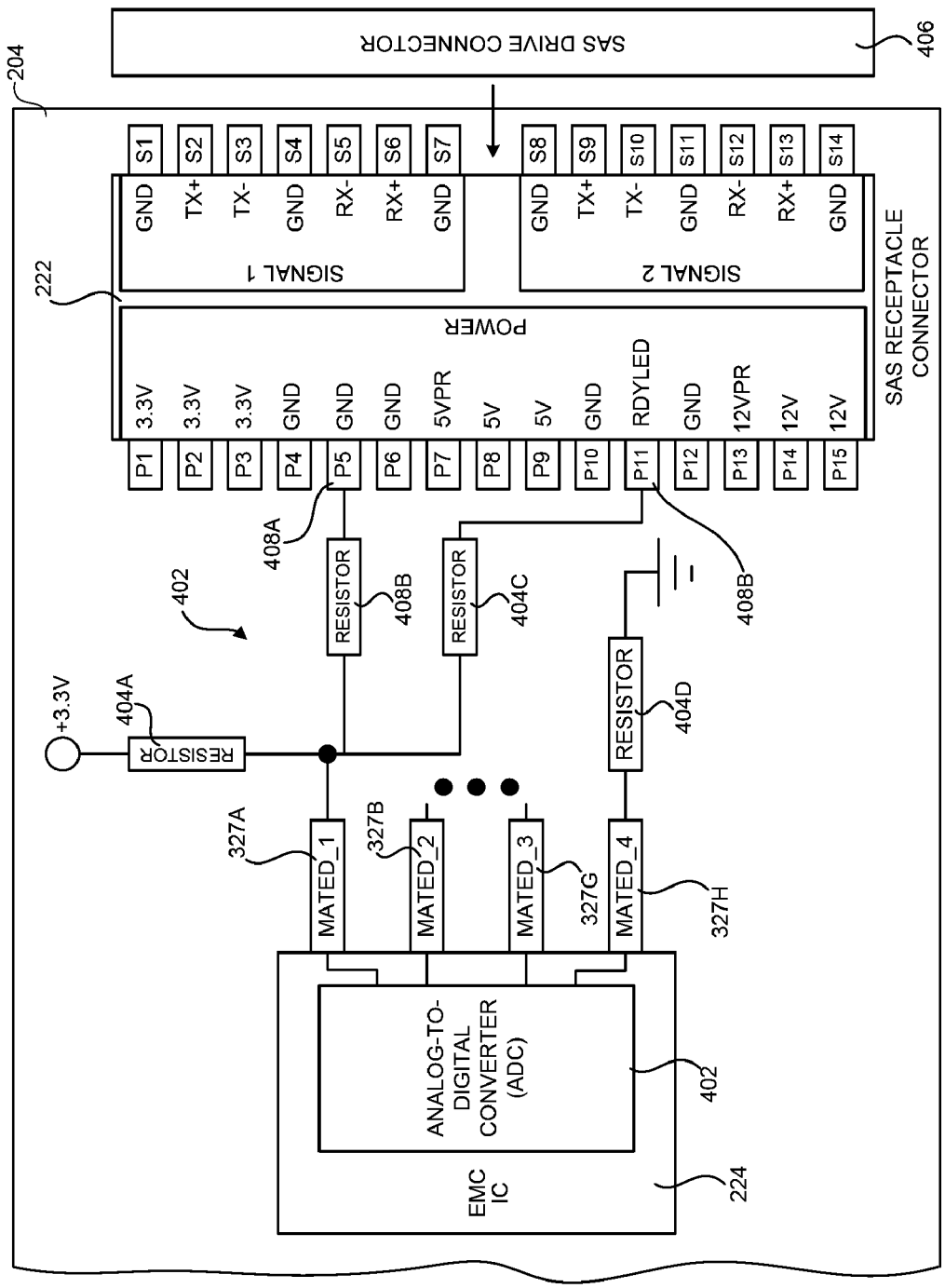
FIG. 4 is a circuit diagram illustrating aspects of a resistor divider circuit provided in one implementation presented herein for detecting the mated status and activity of a mass storage device.

Referring now to FIG. 4, a circuit diagram will be described that illustrates aspects of a resistor divider circuit 402 provided in one implementation presented herein for detecting the mated status and activity of a mass storage device. In the embodiment illustrated in FIG. 4, the enclosure management controller integrated circuit 224 is configured with an ADC 402 connected to one or more of the pins 327A-327H. As discussed briefly above, comparators may be utilized in various embodiments in place of the ADC 402.

In the implementation shown in FIG. 4, the resistor divider circuit 224 includes several resistor dividers. The first resistor divider includes a resister 404A connected to the pin 327A and to power, in this case +3.3V DC. The first resistor divider also includes a resistor 404B connected to the pin 327A and to a pin 408A of the mass storage device receptacle connector 222 reserved for carrying a ground signal. Although reserved for carrying a ground signal, the pin 408A is not connected to ground. In an implementation, the receptacle connector 222 comprises a SAS receptacle connector and the resistor 404B is connected to the pin 408A (P5) of the SAS receptacle connector. It should be appreciated, however, that the resistor 404B might be connected to other pins reserved for carrying a ground signal on the receptacle connector 222.

As will be discussed in greater detail below with respect to FIG. 5, when no mass storage device is mated to the receptacle connector 222, the voltage present at the pin 327A will be in the range of 2.5 to 3.3V DC. When the drive connector 406 of a mass storage device is mated to the receptacle connector 222, however, the resistor 404B will cause the voltage present at the pin 327A to be divided in half, thereby producing a voltage in the range of 1.4V to 1.8V DC. This voltage is read by the ADC 402 to determine the mated status.

According to one embodiment, a second resistor divider is utilized to also convey drive activity information. The second resistor divider includes a resistor 404C connected to the pin 327A and to a pin 408B of the receptacle connector 222 reserved for providing a drive ready signal. According to one embodiment, the resistor 404C is connected to a pin 408B of a SAS receptacle connector reserved for providing a drive ready signal (the READY LED pin). As discussed briefly above, the READY LED pin 408B of the SAS receptacle connector 222 is utilized to convey drive activity information. In this regard, the pin 408B is pulled low when a connected mass storage device is active.

The second resistor divider causes the voltage present at the pin 327A to be halved again when a connected mass storage device is active. In particular, the voltage present at the pin 327A will be halved to a voltage range of 0.9V to 1.2V when a drive is mated and is active. The IC 224 reads this voltage using the ADC 402 and drives a drive activity LED 310 appropriately. It should be appreciated, therefore, that the resistor divider circuit 402 allows both the mated status of a mass storage device and the activity of the device to be provided to the IC 224 utilizing only a single pin of the IC 224 per device.

In one implementation, the resistors 404A-404C are 10K Ohm resistors. It should be appreciated, however, that other types of resistors might be utilized to provide the desired results. It should also be appreciated that more resistors may be utilized than shown in FIG. 4. It should further be appreciated that the voltages and voltage ranges described herein are merely illustrative and that other voltages and voltage ranges may also be utilized. It should also be appreciated that a separate resistor divider circuit 402 is connected to each of the pins 327A-327H and to separate receptacle connectors to provide the above-described functionality for multiple mass storage devices. If any of the pins 327A-327H are not utilized (i.e. there is no corresponding slot for receiving a mass storage device), the pins are pulled to ground, such as through the use of the resistor 404D. In this manner, 0V DC is present at the IC 224 for each of the pins 327A-327H that is not utilized.

Figure 5:
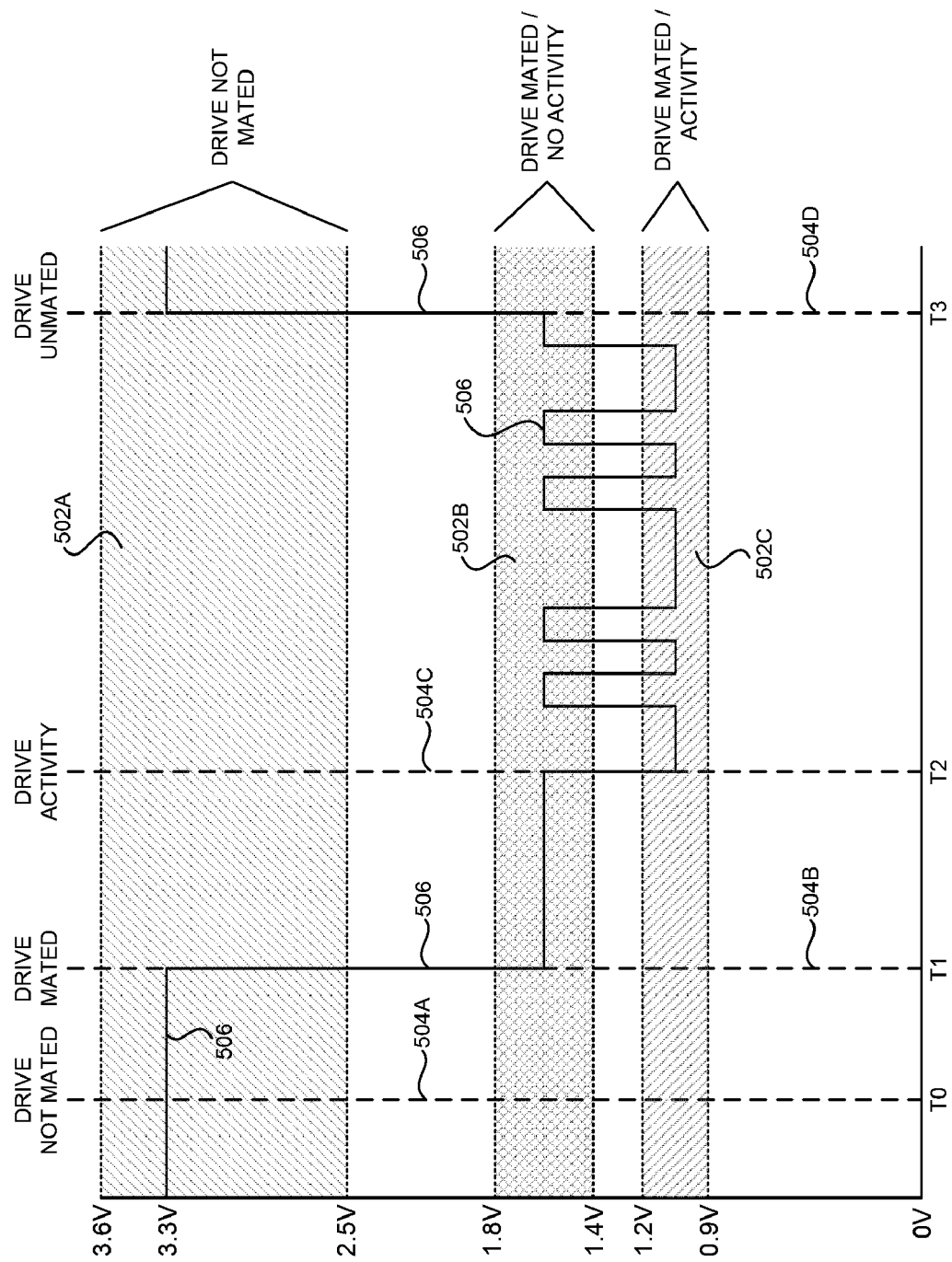
FIG. 5 is a timing diagram illustrating aspects of the output of a resistor divider circuit provided in one implementation for detecting the mated status and activity of a mass storage device.

Turning now to FIG. 5, a timing diagram will be described that illustrates aspects of the output of the resistor divider circuit 402 provided in one implementation for detecting the mated status and activity of a mass storage device. As shown in FIG. 5 and briefly described above, the output of the resistor divider circuit 402 in one implementation is in one of three voltage ranges 502A-502C. When a mass storage device is not mated, the output will be in the voltage range 502A, which is between 2.5V and 3.6V DC in one embodiment. When a mass storage device is mated but is inactive, the output will be in the voltage range 502B, which is between 1.4V and 1.8V DC in one embodiment. When a mass storage device is mated and is also active, the output will be in the voltage range 502C, which is between 0.9V and 1.2 VDC in one embodiment.

FIG. 5 also shows a sample output 506 of the resistor divider circuit 402. At time T0 504A, no mass storage device has been mated to the storage backplane 204. Accordingly, the output 506 at time T0 504A is 3.3V DC, which is within the voltage range 502A. At time T1 504B, a mass storage device is mated to the storage backplane 204. Accordingly, the output 506 drops to 1.6V DC, which is within the voltage range 502B. At time T2 504C, the mass storage device becomes active and the output 506 drops to approximately 1.0V DC, which is within the voltage range 502B. Between time T2 504C and time T3 504D, the mass storage device has periods of activity and inactivity. Accordingly, the output 506 fluctuates during this period between the voltage range 502C and the voltage range 502B. At time T3 504D, the mass storage device is unmated and the output 506 again returns to within the voltage range 502A.

Figure 6:
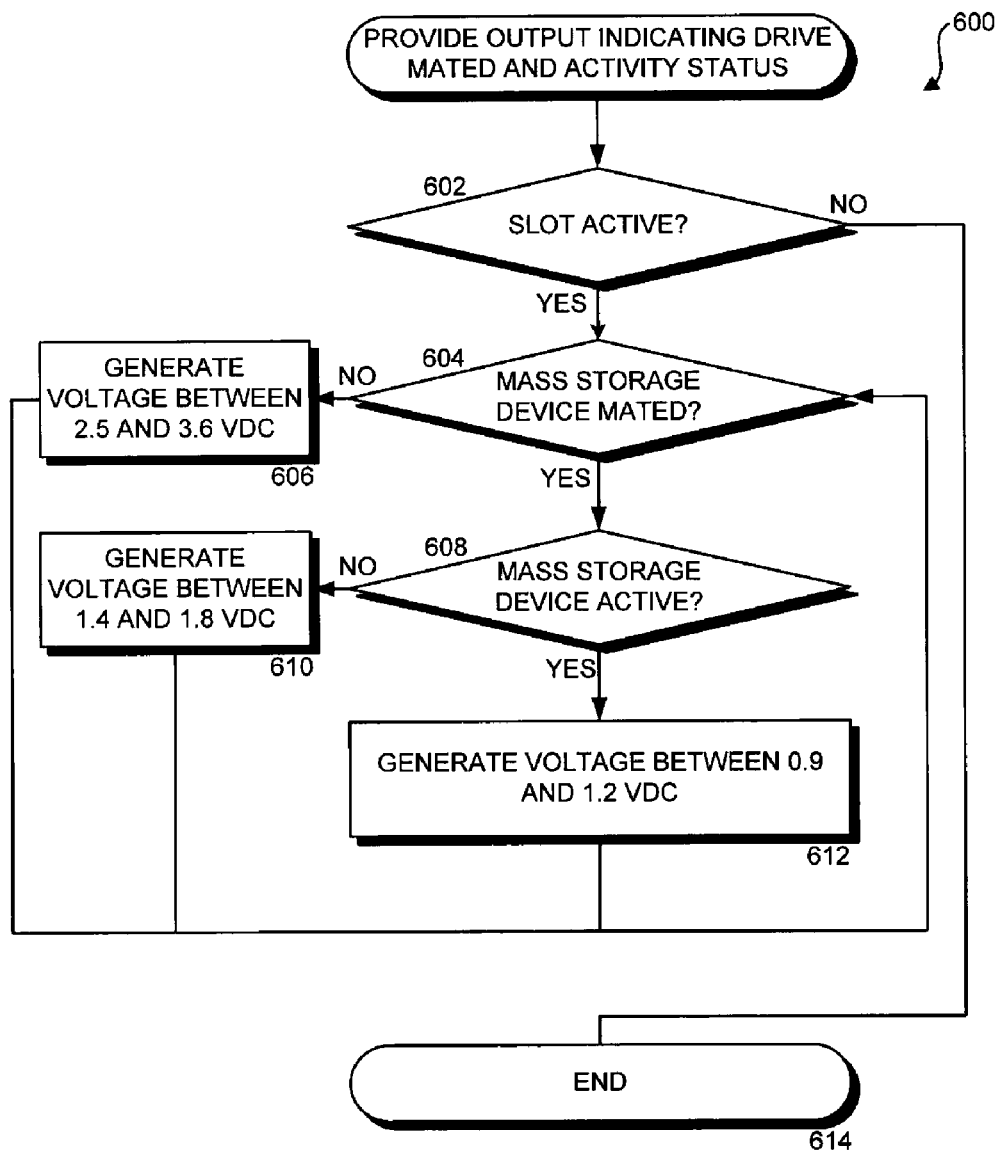
FIG. 6 is a flow diagram illustrating a method of operation provided herein for detecting the mated status and activity of a mass storage device in one embodiment.

Referring now to FIG. 6, a flow diagram will be described that illustrates a method of operation provided herein for detecting the mated status and activity of a mass storage device in one embodiment. It should be appreciated that the logical operations of the various embodiments presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system or integrated circuit integrating the concepts presented herein. Accordingly, the logical operations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 600 begins at operation 602, where a determination is made as to whether one of the pins 327A-327H under consideration is configured for use. As discussed above, any of the pins 327A-327H that will not be utilized are pulled to ground using a resistor 404D. As a result, 0V DC will be present on any of the pins 327A-327H that will not be utilized. If the current pin under consideration is not used, the routine 600 branches to operation 614, where it ends. If the pin 327 is enabled for use, such as through connection to the resistor divider circuit 204, the routine 600 continues to operation 604.

At operation 604, a determination is made as to whether a mass storage device has been mated. If so, the routine 600 branches to operation 606, where the resistor divider circuit 204 generates a voltage within the voltage range 502A (between 2.5 and 3.6V DC). From operation 606, the routine 600 returns to operation 604, described above. If, at operation 604, it is determined that a mass storage device has been mated, the routine 600 continues from operation 604 to operation 608.

At operation 608, a determination is made as to whether the mated mass storage device is active. If the mass storage device is not active, the routine 600 branches to operation 610, where a voltage within the voltage range 502B is generated (between 1.4V and 1.8V DC). If the mass storage device is active, the routine 600 proceeds to operation 612, where a voltage within the voltage range 502C is generated (between 0.9V and 1.2V DC). From operations 606, 610, and 612, the routine 600 returns to operation 604, described above.

Figure 7:
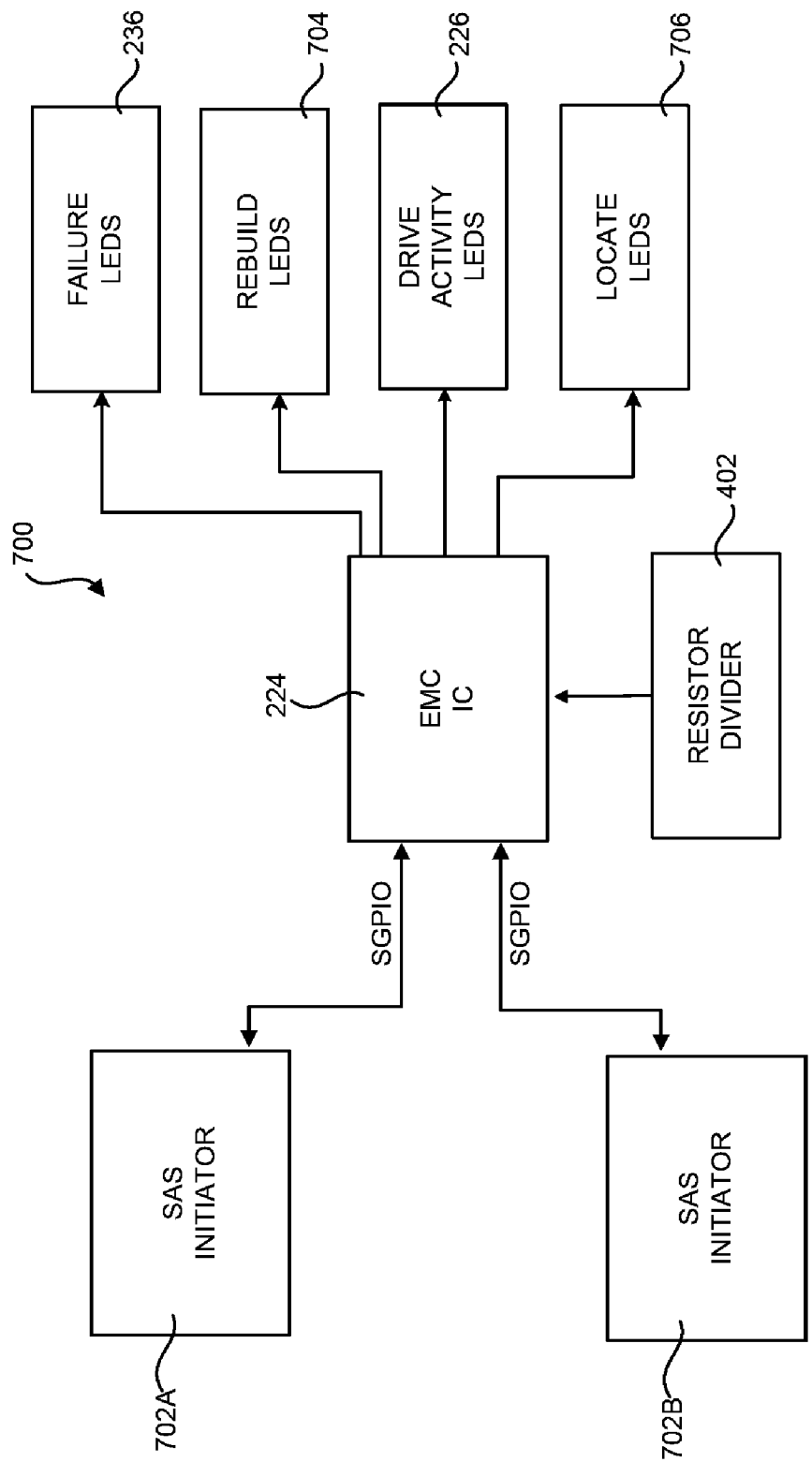
FIGS. 7-8 are simplified circuit diagrams illustrating aspects of one embodiment provided herein for combining multiple SGPIO streams to provide a mass storage device status indicator.

Referring now to FIG. 7, one embodiment provided here for providing an activity indicator for a mass storage device will be described. In particular, FIG. 7 shows a simplified circuit diagram 700 that illustrates aspects of an embodiment presented herein for driving a single activity indicator for a mass storage device based on device activity data received on multiple interfaces. As shown in FIG. 7 and briefly described above, the EMC IC 224 may be configured to receive enclosure management data on multiple interfaces. For instance, in the embodiment illustrated in FIG. 7, the IC 224 has been configured to receive enclosure management data on two different SGPIO interfaces from two distinct SAS initiators 702A-702B. As discussed above with respect to FIGS. 4-6, the IC 224 may also be utilized in conjunction with the resistor divider circuit 402 in order to provide a device activity signal when the IC 224 is utilized in conjunction with SATA mass storage devices. As will be described in greater detail below with respect to FIGS. 8-9, the IC 224 is configured in one implementation to receive device activity data on multiple SGPIO interfaces and directly from a mass storage device, such as through the resistor divider circuit 402 and, based on the received data, to drive the drive activity LEDs 226.

As also shown in FIG. 7, the EMC IC 224 may also provide functionality for combining device status information received from the initiators 702A-702B to drive the failure LEDs 236, the rebuild LEDs 704, or the locate LEDs 706. The failure LEDs 236 are driven when either of the initiators 702A-702B indicates to the IC 224 that a mass storage device has failed. The rebuild LEDs 704 are driven by the IC 224 when either of the initiators 702A-702B indicates to the IC 224 that one of the mass storage devices is being rebuilt. The locate LEDs 706 are driven by the IC 224 when either of the initiators 702A-702B indicates to the IC 224 that an indicator should be provided to assist with locating a particular mass storage device. As with respect to the device activity data described above, this information may be received on either of multiple SGPIO interfaces and combined by the IC 224 to drive the LEDs in an appropriate manner.

Figure 8:
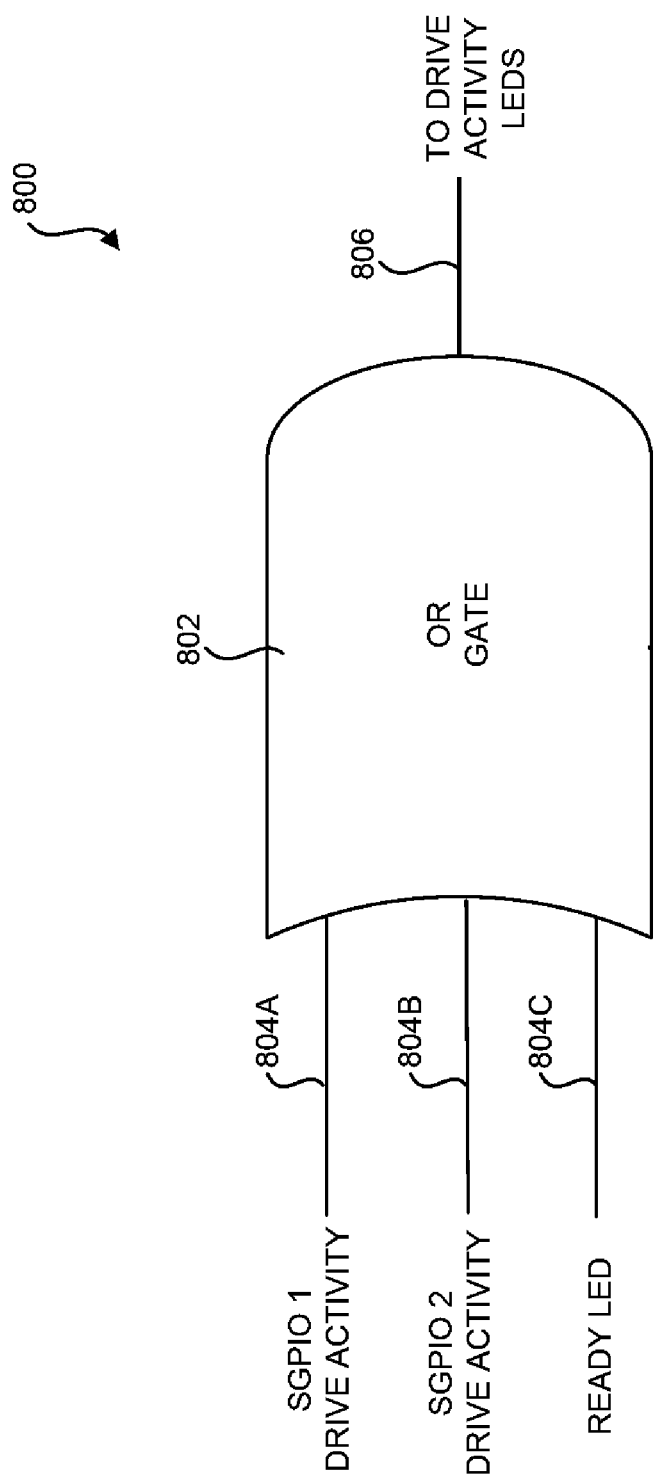

Turning now to FIG. 8, a simplified circuit diagram 800 will be described that illustrates how the IC 224 might drive an activity LED for a mass storage device utilizing device activity data received on multiple interfaces in one embodiment. In the embodiment illustrated in FIG. 8, an OR gate 802 is utilized to provide an output 806 for illuminating drive activity LEDs when data is received indicating that the corresponding mass storage device is active. In one embodiment, the OR gate 802 may be utilized to drive an activity LED when either an input 804A connected to the SGPIO interface 304A indicates that the device is active or when an input 804B connected to the SGPIO interface 304B indicates that the device is active. In this manner, the device activity indicator is illuminated when data received on either of the interfaces 304A-304B indicates that the device is active.

In another embodiment, the OR gate 802 is utilized to drive an activity LED when the input 804A, the input 804B, or the input 804C indicates that the device is active. In this embodiment, the input 804A is connected to the SGPIO interface 304A, the input 804B is connected to the SGPIO interface 304B, and the input 804C is connected to a drive activity signal provided directly by a mass storage device. For instance, in one embodiment, the input 804C may be connected to the pin 408B of a SAS receptacle connector reserved for providing a drive ready signal (the READY LED pin). Alternatively, the input 804C may be connected to the resistor divider circuit 402, described above. It should be appreciated that the circuitry illustrated in FIG. 8 is simplified and that other components may be need to implement the functionality described herein. It should also be appreciated that although an OR gate 802 is illustrated in FIG. 8, an actual OR gate may not be utilized. Rather, the IC 224 may perform a logical OR function utilizing instructions stored in its firmware or through dedicated circuitry on the IC 224. It should be appreciated that other implementations may also be utilized. It should be appreciated that similar logical OR functionality may be utilized to combine devices status data, such as failure data, rebuild data, and locate data, received on multiple SGPIO interfaces to drive LEDs in a similar manner.

Figure 9:
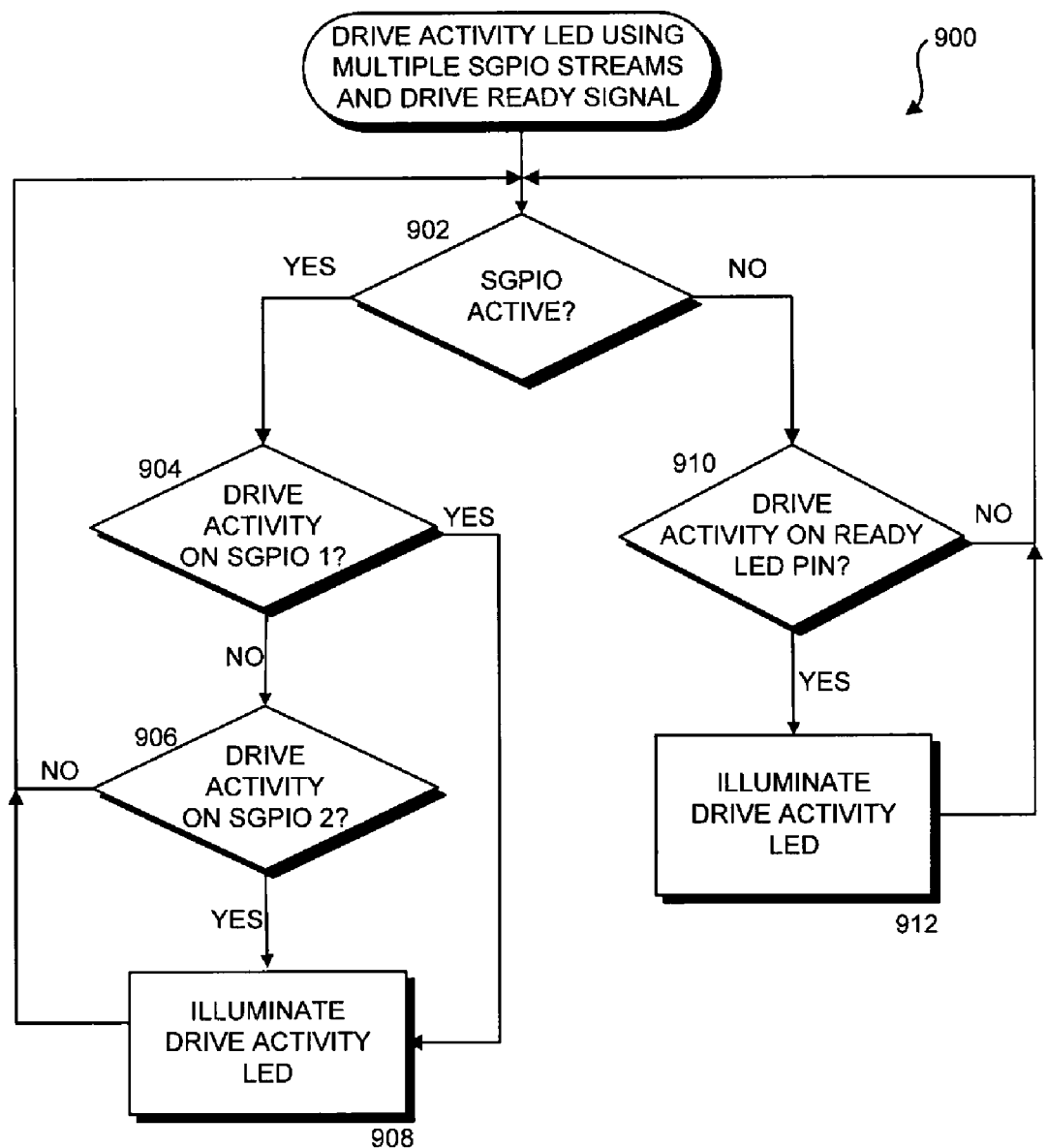
FIG. 9 is a flow diagram illustrating a method for combining multiple SGPIO streams to provide a single mass storage device activity indicator in one embodiment presented herein.

Referring now to FIG. 9, an illustrative routine 900 will be described for illuminating an activity indicator based on data received on multiple SGPIO interfaces and directly from a mass storage device. In the implementation shown in FIG. 9, priority is given to device activity data received on one of the SGPIO interfaces 304A-304B. By providing priority in this manner, an activity indicator will be illuminated utilizing the data received on one of the SGPIO interfaces 304A-304B when data is concurrently received on one or both of the SGPIO interfaces 304A-304B and also directly from the device itself, such as the READY LED signal described above. It should be appreciated that priority may be give to the READY LED signal in other embodiments.

The routine 900 begins at operation 902, where the IC 224 determines whether one or both of the SGPIO interfaces 304A-304B are active. The IC 224 may determine whether the interfaces 304A-304B are active by examining data received on these interfaces or through another method. If one or both of the interfaces 304A-304B are active, the routine 900 branches from operation 902 to operation 904.

At operation 904, the IC 224 determines whether data received on the interface 304A indicates that a mass storage device is active. If so, the routine 900 branches from operation 904 to operation 908, where an activity indicator for the device is provided. For instance, an LED may be illuminated to indicate activity. If, at operation 904, the IC 224 determines that the interface 304A is inactive, the routine 900 proceeds from operation 904 to operation 906.

At operation 906, the IC 224 determines whether data received on the interface 304B indicates that a mass storage device is active. If so, the routine 900 continues from operation 906 to operation 908, where an activity indicator is provided. If the interface 304B is inactive, the routine 900 returns from operation 906 to operation 902, described above. From operation 908, the routine 900 also returns to operation 902, described above.

If, at operation 902, the IC 224 determines that the SGPIO interfaces 304A-304B are inactive, the routine 900 proceeds to operation 910. At operation 910, the IC 224 determines whether an activity signal received from the mass storage device indicates that the device is active. This determination may be made by examining the signal provided on the pin 408B of a SAS receptacle connector reserved for providing a drive ready signal (the READY LED pin). Alternatively, the IC 224 may make this determination by examining the output of the resistor divider circuit 402, described above. If the IC 224 determines that the activity signal received from the mass storage device indicates that the device is active, the routine 910 proceeds to operation 912, where an activity indicator is provided. For instance, an LED may be illuminated to indicate activity. If the activity signal received from the mass storage device indicates that the device is not active, the routine 900 returns to operation 902, described above.

According to other embodiments, the interface 224 may ignore interfaces that are inactive. For instance, the IC 224 may utilize data received on one of the interfaces 304A-304B or a period of inactivity to determine that an interface is inactive. If an interface is determined to be inactive, the IC 224 will not poll that interface to determine if drive activity data has been transmitted on the interface. Similarly, if the resistor divider circuit 402 described above indicates that a drive is not present, data transmitted on the interfaces 304A-304B for the device will be ignored and no activity indicator will be provided for the mass storage device.

It should be appreciated that although an activity indicator has been described herein primarily as an LED, other types of visual, audible, or haptic indicators may be utilized to provide an indication to a user when a mass storage device is active. Moreover, although providing an activity indicator has been primarily described in the context of illuminating an LED to indicate activity, in other embodiments an LED or other type of illumination device may be extinguished to indicate activity. For instance, in one embodiment an LED is illuminated when a mass storage device is mated to an HBA and extinguished when the device is active. In this manner, a single LED can be utilized to indicate both the mated and activity status of a mass storage device. Other combinations may also be utilized.

It will be appreciated that technologies are presented herein for combining multiple SGPIO streams to provide a single mass storage device activity indicator. Although the embodiments presented herein have been described in language specific to computer structural features, methodological acts and by computer readable media, and implementations utilizing a semiconductor integrated circuit, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for providing an activity indicator for a mass storage device, the method comprising: receiving data on a first serial general purpose input/output (SGPIO) interface; receiving data on a second SGPIO interface; illuminating an the activity indicator for the mass storage device when either the data received on the first SGPIO interface or the data received on the second SGPIO interface indicates that the mass storage device is active; illuminating a rebuild indicator for the mass storage device when the combination of the data received on the first SGPIO interface and the data received on the second SGPIO interface indicates that the mass storage device is being rebuilt, wherein the first SGPIO interface, the second SGPIO interface, activity indicator, and the rebuild indicators are configured on a single storage backplane; and receiving an activity signal from the mass storage device, and wherein illuminating the activity indicator comprises illuminating the activity indicator for the mass storage device when either the data received on the first SGPIO interface, the data received on the second SGPIO interface, or the activity signal received directly from the mass storage device indicates that the mass storage device is active.

2. The method of claim 1, further comprising illuminating a locate indicator for the mass storage device when the combination of the data received on the first SGPIO interface and the data received on the second SGPIO interface indicates that the locate indicator should be illuminated.

3. The method of claim 1, further comprising illuminating a failure indicator for the mass storage device when the combination of the data received on the first SGPIO interface and the data received on the second SGPIO interface indicates that the mass storage device has failed.

4. The method of claim 1, wherein the activity signal comprises a drive ready signal received from the mass storage device on a READY LED pin of a Serial Attached Small Computer Systems interface (SAS) receptacle connector or a Serial Advanced Technology Attachment (SATA) receptacle connector.

5. The method of claim 4, further comprising providing priority to the data received on the first SGPIO interface and the data received on the second SGPIO interface over the activity signal from a mass storage device, thereby illuminating the activity indicator based on the data received on the first SGPIO interface or the data received on the second SGPIO interface when data received on the first SGPIO interface, data received on the second SGPIO interface, and the activity signal concurrently indicate that the mass storage device is active.

6. The method of claim 4, further comprising:
   detecting the inactivity of either the first SGPIO interface or the second SGPIO interface; and
   ignoring data received on the first SGPIO interface or the second SGPIO interface when the respective interface is determined to be inactive.

7. The method of claim 6, wherein inactivity is determined based on content of data received on one of the first SGPIO interface and the second SGPIO interface.

8. The method of claim 6, wherein inactivity is detected following a time period of inactivity on one of the first SGPIO interface and the second SGPIO interface.

9. The method of claim 4, further comprising:
   detecting the presence or absence of the mass storage device by sensing the voltage across a pull-up resistor connected to a voltage source and to a pin on the SAS receptacle connector or the SATA receptacle connector; and
   in response to detecting the absence of the mass storage device, extinguishing the activity indicator and ignoring data received on either the first SGPIO interface or the second SGPIO interface.

10. An enclosure management integrated circuit configured to provide an activity indicator and a rebuild indicator for a mass storage device, the integrated circuit comprising: a first interface configured to receive data indicating whether the mass storage device is active, wherein the first interface comprises one of a serial general purpose input/output (SGPIO) interface or an I²c interface; a second interface configured to receive data indicating whether the mass storage device is active, wherein the second interface comprises one of an SGPIO interface or an I²c interface; means for illuminating the activity indicator for the mass storage device when either the data received on the first interface or the data received on the second interface indicates that the mass storage device is active; and means for illuminating the rebuild indicator for the mass storage device when either the combination of the data received on the first interface and the data received on the second interface indicates that the mass storage device is being rebuilt, wherein the first interface, second interface, means for illuminating the activity indicator, and means for illuminating the rebuild indicator are configured on a single storage backplane; and further comprising a third interface configured to receive an activity signal from the mass storage device, and wherein the means for illuminating the activity indicator comprises means for illuminating the activity indicator for the mass storage device when either the data received on the first interface, the data received on the second interface, or the activity signal received on the third interface indicates that the mass storage device is active.

11. The enclosure management integrated circuit of claim 10, wherein the activity signal comprises a drive ready signal received from the mass storage device on a READY LED pin of a Serial Attached Small Computer Systems interface (SAS) receptacle connector or a Serial Advanced Technology Attachment (SATA) receptacle connector.

12. The enclosure management integrated circuit of claim 11, wherein the means for illuminating the activity indicator is further operative to ignore data received on one of the first or second interfaces that has been determined to be inactive for a predetermined period of time.

13. The enclosure management integrated circuit of claim 12, wherein the means for illuminating the activity indicator is further operative to:
   detect the presence or absence of the mass storage device by sensing the voltage across a pull-up resistor connected to a voltage source and to a pin on the SAS receptacle connector or the SATA receptacle connector; and to
   ignore data received on either the first or second interface and to extinguish the activity indicator in response to detecting the absence of the mass storage device.

14. The enclosure management integrated circuit of claim 13, wherein the means for illuminating the activity indicator is further operative to: illuminate the activity indicator when the presence of the mass storage device is detected; and to extinguish the activity indicator when the mass storage device is determined to be inactive.

15. A non-transitory computer-readable medium having executable instructions stored thereon which, when executed, cause a processor to: receive data on a first serial general purpose input/output (SGPIO) interface; receive data on a second SGPIO interface; cause an activity indicator for the mass storage device to be illuminated when either the data received on the first SGPIO interface or the data received on the second SGPIO interface indicates that the mass storage device is active; and cause a rebuild indicator for the mass storage device to be illuminated when the data received on the first SGPIO interface and the data received on the second SGPIO interface indicates that the mass storage device is being rebuilt; and to receive the activity signal directly from the mass storage device, and wherein causing an activity indicator for the mass storage device to be illuminated comprises causing the activity indicator for the mass storage device to be illuminated when either the data received on the first SGPIO interface, the data received on the second SGPIO interface, or the activity signal indicates that the mass storage device is active.

16. The non-transitory computer-readable medium of claim 15, wherein the activity signal comprises a drive ready signal received from the mass storage device on a READY LED pin of a Serial Attached Small Computer Systems interface (SAS) receptacle connector or a Serial Advanced Technology Attachment (SATA) receptacle connector.

17. The non-transitory computer-readable medium of claim 16, having further executable instructions stored thereon which, when executed, cause the processor to provide priority to the data received on the first SGPIO interface and the data received on the second SGPIO interface over the activity signal, thereby causing the activity indicator to be illuminated based on the data received on the first SGPIO interface or the data received on the second SGPIO interface when data received on the first SGPIO interface, data received on the second SGPIO interface, and the activity signal concurrently indicate that the mass storage device is active.

* * * * *